United States Patent
Osuda et al.

(10) Patent No.: US 6,656,359 B1
(45) Date of Patent: Dec. 2, 2003

(54) METHOD AND APPARATUS FOR REUSE OF ABRASIVE FLUID USED IN THE MANUFACTURE OF SEMICONDUCTORS

(75) Inventors: Hiroshi Osuda, Kasugai (JP); Toru Matoba, Kasugai (JP); Masataka Fukuizumi, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/357,826

(22) Filed: Jul. 21, 1999

(30) Foreign Application Priority Data

Dec. 25, 1998 (JP) .............................. 10-369447

(51) Int. Cl.⁷ .......................... B01D 61/00; B01D 61/58
(52) U.S. Cl. ...................... 210/636; 210/639; 210/641; 210/651; 210/739
(58) Field of Search ................................ 210/173, 768, 210/769, 770, 803, 805, 636, 639, 641, 650, 651, 739

(56) References Cited

U.S. PATENT DOCUMENTS

| | | | | |
|---|---|---|---|---|
| 4,920,704 A | * | 5/1990 | Caserta et al. ................ 51/302 |
| 5,043,071 A | * | 8/1991 | Anselme et al. ............. 210/636 |
| 5,578,222 A | * | 11/1996 | Trischuk et al. ............. 210/773 |
| 5,647,989 A | * | 7/1997 | Hayashi et al. .............. 210/641 |
| 5,830,369 A | * | 11/1998 | Toyama ....................... 210/773 |
| 6,001,265 A | * | 12/1999 | Toyama et al. ............. 210/773 |

FOREIGN PATENT DOCUMENTS

| | | |
|---|---|---|
| CN | 85111548 | 1/1998 |
| JP | 08-003543 | 1/1996 |
| JP | 09-168971 | 6/1997 |
| JP | 09-239661 | 9/1997 |
| JP | 09-285967 | 11/1997 |

OTHER PUBLICATIONS

Office Action Dated Feb. 19, 2002 from JPO—No Translation.
Taiwanese Office Action dated Oct. 9, 2000 with translation.

* cited by examiner

Primary Examiner—Robert Popovics
(74) Attorney, Agent, or Firm—Armstrong, Kratz, Cuintos, Hanson & Brooks, LLP

(57) ABSTRACT

An apparatus and method recycles the abrasive fluid or slurry effluent used in the polishing step in the manufacture of semiconductors. Agglomerations of abrasive grains built up in the slurry effluent are crushed using a mill, ultrasonic oscillation, or pressurized circulation. The slurry effluent is then regenerated and reused.

10 Claims, 3 Drawing Sheets

METHOD AND APPARATUS FOR REUSE OF ABRASIVE FLUID USED IN THE MANUFACTURE OF SEMICONDUCTORS

BACKGROUND OF THE INVENTION

The invention relates to an apparatus for use in the manufacture of semiconductors, and more particularly, to a method and an apparatus for reuse of an abrasive fluid used in the manufacture of semiconductor devices.

A chemical-mechanical polishing (CMP) device is used in flattening a wafer surface in a semiconductor manufacturing step. The CMP device employs an abrasive slurry, and accordingly, as the quantity of products manufactured increases, the quantity of used abrasive slurry also increases. The quantity of abrasive slurry used influences the manufacturing cost, and hence an efficient reuse of the used abrasive slurry or fluid is required.

In the conventional practice of flattening a wafer surface, an abrasive slurry in liquid form which comprises a commercially available abrasive stock having a weight percentage of approximately 25 wt % and diluted by deionized water to nearly 13 wt % is used. Used abrasive fluid is further diluted within the polishing device to produce an effluent which may have a concentration on the order of about 0.1 to 0.2 wt %, for example. It will be understood that the abrasive effluent contains fragments of films abraded from the wafer and impurities produced by a polishing table (or pad) of the polishing device. Abrasive effluents are generally passed through a neutralization treatment before disposal or delivered to an industrial waste disposal undertaker in the form of sludges which result from a drainage treatment. The abrasive fluid represents a significant proportion of the wafer processing cost, but the abrasive effluent has been disposed of without a reuse thereof.

Abrasive grains contained in the abrasive effluent are agglomerated to larger sizes. However, a single grain in the agglomeration has a grain diameter which remains substantially unchanged from the grain size which it exhibited before it was fed to the polishing step, and thus retains a grain size which is still useable in the abrasive operation. Nevertheless, the grain agglomerations are disposed of without being recycled.

The cost of disposing sludges delivered to the industrial waste disposal undertaker adds to the semiconductor manufacturing cost. Thus, reuse of the abrasive effluent is of importance in reducing the semiconductor manufacturing cost.

It is an object of the invention to provide a method and an apparatus which allow reuse of an abrasive effluent.

SUMMARY OF THE INVENTION

In a first aspect of the present invention, a method is provided that reuses a slurry effluent containing agglomerations of abrasive grains which has been used in a polishing step in the manufacture of a semiconductor. First, the agglomerations of abrasive grains contained in the slurry effluent are crushed. Then, an abrasive fluid is regenerated using the slurry effluent containing the crushed abrasive grains.

In a second aspect of the present invention, an apparatus is provided that reuses a slurry effluent containing agglomerations of abrasive grains which has been used in a polishing step in the manufacture of a semiconductor. The apparatus includes a crusher for crushing the agglomerations of abrasive grains contained in the slurry effluent and a regeneration unit for regenerating an abrasive fluid using the slurry effluent containing the crushed abrasive grains.

In a third aspect of the present invention, a crusher is provided that crushes agglomerations of abrasive grains contained in a slurry effluent which has been used in the manufacture of a semiconductor. The crusher includes a tank for storing the slurry effluent and at least one of a mill, an ultrasonic oscillator and a pressurizing circulation unit attached to the tank.

In a fourth aspect of the present invention, an apparatus for concentrating a slurry effluent is provided. The apparatus includes a concentrating unit including a concentrating membrane for separating the slurry effluent into a concentrate fluid and a permeate fluid; a temperature regulator for adjusting the temperature of the slurry effluent; and a concentration controller for controlling the temperature regulator to control the concentration of the concentrate fluid.

In a fifth aspect of the present invention, an apparatus for regulating the quality of a slurry effluent including abrasive grains is provided. The apparatus includes a tank for storing the slurry effluent and a specific gravity adjusting unit for adjusting the concentration of the abrasive grains in the slurry effluent.

In a sixth aspect of the present invention, an apparatus for regulating the quality of a slurry effluent including abrasive grains is provided. The apparatus includes a tank for storing the slurry effluent and a pH adjusting unit for adjusting the pH of the slurry effluent.

In a seventh aspect of the present invention, an apparatus for cleansing a concentrating membrane used in concentrating a slurry effluent is provided. A concentrate fluid and a permeate fluid are generated by concentrating the slurry effluent. The apparatus includes a chamber for temporarily storing the permeate fluid and a back washing unit for cleansing the concentrating membrane using the permeate fluid stored in the chamber.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

An abrasive effluent regeneration plant according to one embodiment of the present invention will now be described with reference to FIGS. 1 to 3.

Figure 1:
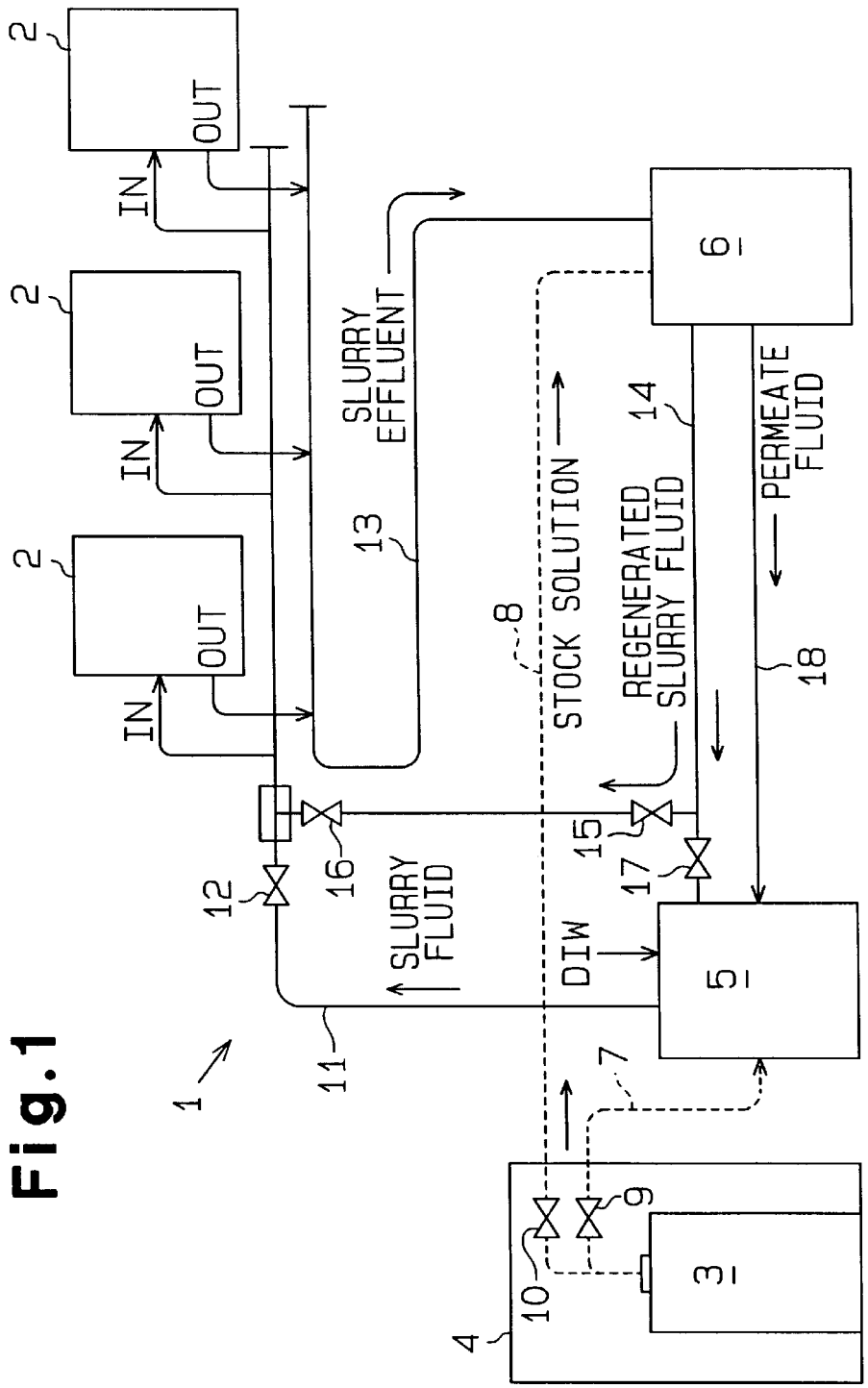
FIG. 1 is a schematic diagram of an abrasive effluent regeneration plant according to one embodiment of the present invention.

FIG. 1 is a schematic diagram of the abrasive effluent regeneration plant 1, which includes a circulation system including a feed system for feeding an abrasive solution to a plurality of polishing devices 2, which may be three in number, and a regeneration system which regenerates an abrasive effluent or a slurry effluent discharged from the polishing devices 2. Specifically, the plant 1 comprises a stock solution drum cabinet 4 containing a stock solution drum 3, a slurry feeder 5, and a slurry effluent regeneration unit 6. The polishing devices 2 preferably comprise a chemical-mechanical polishing (CMP) device, which is used to abrade a metal layer or oxide layer of aluminium, for example, formed on a semiconductor wafer.

The stock solution drum 3 contains a stock solution containing abrasive grains, for example, fine particles of alumina. Preferably, the stock solution has a concentration of about 25 wt %. The stock solution drum 3 is connected to the slurry feeder 5 via a channel 7, and is also connected to the slurry effluent regeneration unit 6 via a channel 8. The stock solution is fed to the feeder 5 and the unit 6 by opening valves 9, 10 which are disposed in the channels 7,8, respectively.

While not shown, the slurry feeder 5 includes a mixing tank. A given proportion of stock solution which is fed from the drum 3 is diluted by and mixed with deionized water (DIW) to prepare a slurry fluid. At this end, deionized water used for the dilution is fed to the slurry feeder 5. Preferably, the prepared slurry fluid has a concentration of about 13 wt %. It is preferred that a pair of mixing tanks are provided to be used in an alternate fashion. The slurry feeder 5 is connected to each of the polishing devices 2 via a feed channel 11, and a valve 12 is provided in the feed channel 11 to allow the slurry fluid from the slurry feeder 5 to be fed to each of the polishing devices 2 when it is opened. The quantity of the slurry fluid fed to each polishing device 2 is regulated by the opening of the valve 12.

Each polishing device 2 feeds the slurry fluid onto a polishing pad disposed on a rotary table, and polishes a wafer by urging the wafer against the pad. Used slurry fluid is diluted by water and is then discharged as a slurry effluent, thus preventing loading or plugging of a clearance around the table by abrasive grains. The slurry effluent has a concentration of preferably about 0.1–0.2 wt %. The slurry effluent is discharged from each polishing device 2 to the slurry effluent regeneration unit 6 through a discharge channel 13.

The slurry effluent regeneration unit 6 regenerates the slurry effluent by separating it into a regenerated and concentrated slurry fluid (hereafter simply referred to as regenerated slurry fluid) which is concentrated to a given concentration which is the same as that of an initial or original slurry fluid, and a permeate fluid. The regenerated slurry fluid is fed from the slurry effluent regeneration unit 6 through a circulation channel 14 which merges with the feed channel 11 so as to be circulated through the individual polishing devices 2. Intermediate its length, the circulation channel 14 has a branch connecting it to the slurry feeder 5. The regenerated slurry fluid is fed to each polishing device 2 by opening valves 15, 16 disposed in the circulation channel 14, and is also fed to the slurry feeder 5 by opening a valve 17 disposed in the branched channel. In the manner, by controlling the opening of the valves 15–17, the regenerated slurry fluid can be selectively fed to the polishing devices 2 and the slurry feeder 5. The permeate fluid is passed from the regeneration unit 6 to the slurry feeder 5 through a permeate channel 18, where it is used to dilute the stock solution used to prepare the slurry fluid. Each of the valves 9, 10, 12 and 15–17 is controlled by a controller, not shown.

Figure 2:
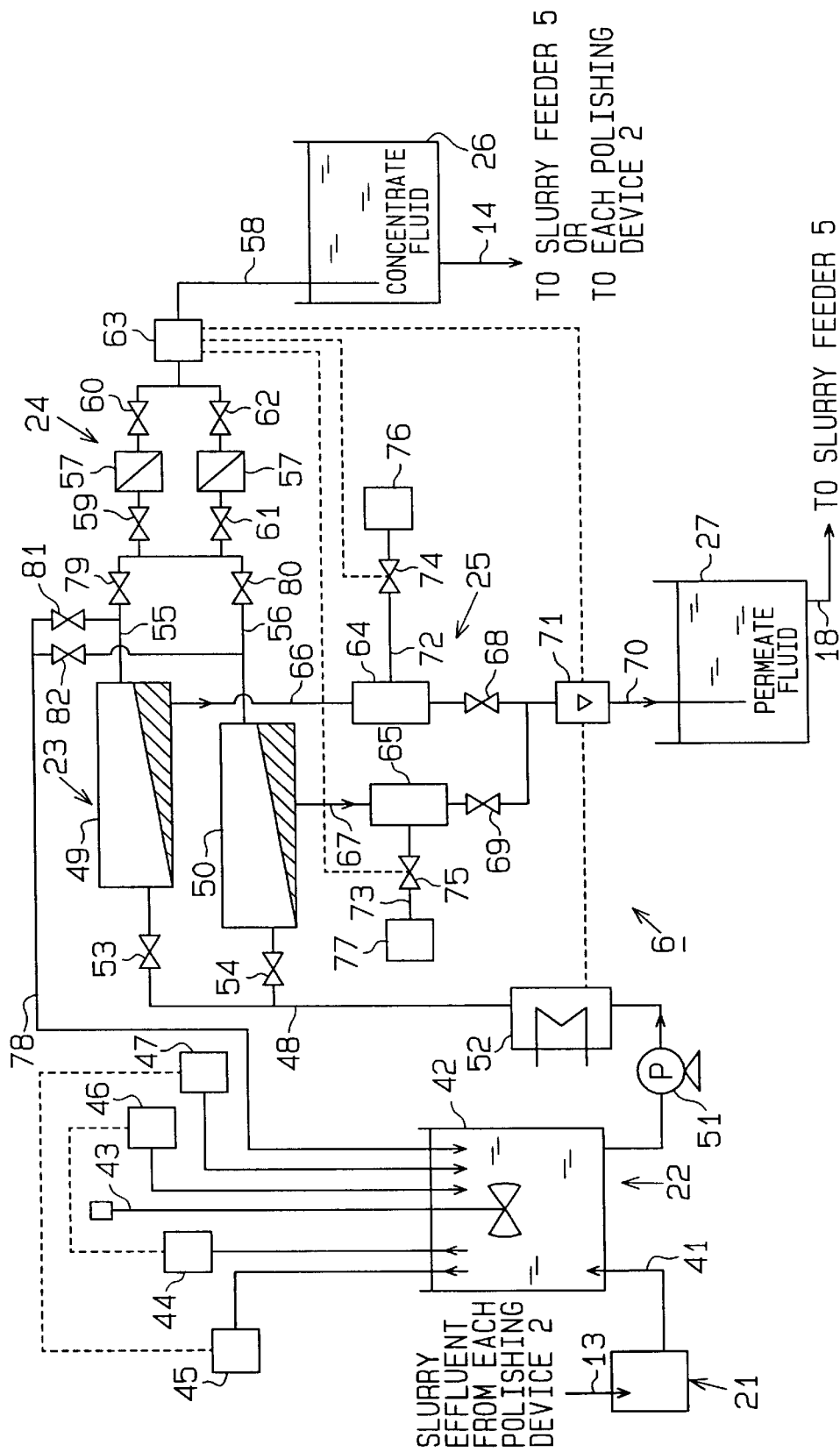
FIG. 2 is a schematic diagram of a slurry effluent regeneration unit of the plant of FIG. 1.

FIG. 2 is a schematic diagram of the slurry effluent regeneration unit 6, which comprises a crusher 21, a fluid quality regulator 22, a concentration unit 23, a coarse filter 24, a back washer 25, a concentrated fluid tank 26 and a permeate fluid tank 27.

The purpose of the crusher 21 is to crush agglomerations of abrasive grains contained in the slurry effluent. A schematic diagram of the crusher 21 is shown in FIG. 3. Specifically, the crusher 21 includes a crushing tank 32 having a crushing chamber 31 therein, and a mill 33, an agitator 34 and a ultrasonic vibrator plate 35 which are disposed within the crushing tank 32. A pressurizing circulation unit comprising a circulating pipe 36 and a pressurizing pump 37 is connected to the crushing chamber 31. The ultrasonic vibrator plate 35 is connected with an ultrasonic oscillator 38 which energizes the plate 35 for vibration at a high frequency. The combination of the vibrator plate 35 and the oscillator 38 defines an ultrasonic oscillation system.

The slurry effluent from the discharge channel 13 is initially injected into the mill 33 at a pouring port 39. The agglomerations of abrasive grains contained in the slurry effluent are crushed by the mill 33, and are then further crushed and dispersed by the ultrasonic vibration of the vibrator plate 35, which is energized by the oscillator 38. The slurry effluent which accumulates in the crushing chamber 31 is agitated by the agitator 34. Injection of the slurry effluent into the crushing chamber 31 is via the pump 37 and through the circulating pipe 36, which causes an impingement of the slurry effluent against the internal wall of the crushing chamber 31, thus crushing the agglomerations into individual abrasive grains.

It is not always necessary to use all three of the mill 33, the pressurizing pump 37 and the ultrasonic oscillator 38, but any one of these three may be chosen as required. However, it is effective to use a combination of a pressurizing circulation crushing technique using the pressuring tank 37 and an ultrasonic oscillation crushing technique using the ultrasonic oscillator 38. After the crushing step, the slurry effluent is discharged from the crushing tank 32 through a discharge port 40 into a channel 41 to a stock solution tank 42 (see FIG. 2) of the fluid quality regulator 22.

Referring to FIG. 2, the purpose of the fluid quality regulator 22 is to regulate the quality of the slurry effluent crushed by the crusher 21, and/or to perform a pretreatment, including a specific gravity adjustment and a pH adjustment, which enables an efficient concentrating operation within the concentrating unit 23. The fluid quality regulator 22 comprises a stock solution tank 42, an agitator 43, a desitometer 44, a pH meter 45, a specific gravity controller 46 and a pH controller 47. The pretreatment is performed while agitating the slurry effluent by means of the agitator 43. The combination of the desitometer 44 and the specific gravity controller 46 defines a specific gravity regulator while the combination of the pH meter 45 and the pH controller 47 defines a pH regulator.

The adjustment of the specific gravity is performed using the desitometer 44 and the gravity controller 46. The specific gravity of the slurry effluent within the stock solution tank 42 is measured by the desitometer 44. The specific gravity controller 46 adjusts if the specific gravity or concentration of the slurry effluent has reached a given value on the basis of a measured value of the specific gravity. If the measured value of the specific gravity does not reach the given value, the specific gravity controller 46 controls the specific gravity of the slurry effluent by adding a fresh slurry fluid or regenerated slurry fluid thereto. In this manner, the concentration of the slurry effluent is adjusted so that a regenerated slurry fluid having a desired concentration may be obtained.

The adjustment of the pH value is performed using the pH meter 45 and the pH controller 47. The pH value of the slurry effluent within the stock solution tank 42 is measured by the pH meter 45. The pH controller 47 determines if the pH value of the slurry effluent has reached a given value on the basis of the measured pH value. If the measured pH value does not reach the given value, the pH controller 47 adjusts the pH of the slurry effluent by adding an alkali solution or an acid thereto. The slurry effluent, as it is discharged from the polishing devices 2, has a pH value of about 9. The pH controller 47 adjusts the pH value of the slurry effluent so that a slurry effluent having a pH value of about 10.5 is obtained. When the pH value of the slurry effluent is adjusted in this manner, the agglomerations of abrasive grains which have not yet been crushed become likely to be disintegrated, thus improving the dispersibility of abrasive grains in the slurry effluent.

The concentration unit 23 comprises a pair of concentrating membrane units 49, 50, a heat exchanger 52 which is used in controlling the degree of concentration of the regenerated slurry fluid, a flow rate controller 63 and a flowmeter 71. The concentrating membrane units 49 and 50 are connected to the stock solution tank 42 via a channel 48, in which a pump 51 and the heat exchanger 52, serving as a temperature regulator, are disposed. The pump 51 feeds the slurry effluent from the stock solution tank 42 to the concentrating membrane units 49, 50 through the channel 48. The heat exchanger 52 adjusts the temperature of the slurry effluent before it is fed to the concentrating membrane units 49, 50. Two valves 53, 54 are disposed in the channel 48 to control the flow of the slurry effluent to the concentrating membrane units 49, 50.

Each of the concentrating membrane units 49, 50 separates the slurry effluent, after the regulation of the fluid quality thereof, into a concentrate fluid and a permeate fluid. The concentrate fluid is passed from the concentrating membrane units 49, 50 through channels 55, 56, respectively, to a pair of microfilters 57 where it is coarsely filtered. After the coarse filtration, the concentrate fluid is discharged to the concentrate fluid tank 26 through a discharge channel 58. The microfilters 57 removes abrasive grains which have not been crushed from the concentrate fluid. In this manner, any damage of the wafer by the concentrate fluid is prevented when the concentrate fluid which accumulates in the concentrate fluid tank 26 is used as the regenerated slurry fluid. The concentrate fluid fed to the tank 26 has substantially the same concentration as the concentration of the slurry fluid used in the polishing device 2. Accordingly, the concentrate fluid can be directly used as the regenerated slurry fluid. One of the pair of microfilters 57 can be selected by opening or closing valves 59–62 associated with the respective microfilters 57. It will be noted that the flow rate controller 63 is disposed in the discharge channel 58 in order to control the flow rate of the concentrate fluid.

The back washer 25 comprises a pair of back wash chambers 64, 65, a pair of control valves 74, 75 and a pair of gas purgers 76, 77. The purpose of the back washer 25 is to cleanse the concentrating membranes in the units 49, 50 utilizing the permeate fluid. The pair of back wash chambers 64, 65 each operate to receive and temporarily store the permeate fluid from the respective concentrating membrane unit 49 or 50 through channels 66, 67. Valves 68, 69 are disposed in the channels 66, 67 at locations downstream of the back wash chambers 64, 65, respectively, and are closed when these chambers 64, 65 store the permeate fluid. When the valves 68, 69 are opened, the permeate fluid is passed through a discharge channel 70 to the permeate fluid tank 27.

The flow rate of the permeate fluid is measured by the flowmeter 71 disposed in the discharge channel 70. The flow rate controller 63 controls the flow rate of the permeate fluid, as measured by the flowmeter 71, using the heat exchanger 52. That is, when the temperature of the slurry effluent rises, the speed of the slurry effluent passing through the concentrating membrane increases, while in the opposite instance, the speed of the slurry effluent decreases. Thus, the flow rate controller 63 controls the flow rate of the permeate fluid by controlling the temperature fluid using the heat exchanger 52, so that the flow rate is maintained at a given value. When the flow rate controller 63 fails to maintain the flow rate of the permeate fluid at a given value, it determines that the concentrating membranes are to be cleansed, and a back wash is performed. A combination of the heat exchanger 52, the flow rate controller 63 and the flowmeter 71 defines the degree of concentration control.

The back wash chambers 64, 65 are connected via channels 72, 73 to gas purgers 76, 77, respectively. Control valves 74, 75 are disposed in the channels 72, 73, respectively, thereby allowing the gas purgers 76, 77 to feed a high pressure inert gas (such as nitrogen or argon, for example) into the back wash chambers 64, 65, respectively. The inert gas prevents oxidation of the permeate fluid. The gas which is fed into the back wash chambers 64, 65 causes a back flow of the permeate fluid within the back wash chambers 64, 65 through the channels 66, 67, respectively, such that the permeate fluid is strongly ejected onto the concentrating membranes in the units 49, 50, thus cleansing the concentrating membranes. It will be noted that the concentrating membrane units 49, 50 are connected to the stock solution tank 42 via the channels 55, 56 as well as a channel 78. When back washing the concentrating membranes in the units 49, 50, both of the valves 53, 54 disposed upstream of the units 49, 50 and the valves 79, 80 disposed downstream of the units 49, 50 are closed, while valves 81, 82 disposed in the return channel 78 are opened. In this manner, the permeate fluid used in the back wash process is returned to the stock solution tank 42 through the return channel 78. It is to be noted that the back wash process for cleansing the membranes in the units 49, 50 is performed separately for each unit.

The concentrate fluid in the concentrate fluid tank 26 is discharged into the circulating channel 14 and fed to the polishing devices 2 or the slurry feeder 5. On the other hand, the permeate fluid from the permeate fluid tank 27 is discharged through the channel 18 to the slurry feeder 5.

The operation of the plant 1 will now be described.

The slurry effluent which has been used in the polishing process in each polishing device 2 is transferred to the crushing chamber 31 of the crusher 21. It is to be understood that agglomerations of abrasive grains which have diameters on the order of about 500 nm are present in the slurry effluent. It is also to be understood that abrasive grains in a fresh fluid have diameters of around 100 nm, and thus an agglomeration is formed of about 125 abrasive grains. It is possible that the agglomeration also contains fragments of films abraded from the wafer and impurities such as exfoliation from the polishing pad. However, the amount of such fragments of films and impurities is negligible compared with the quantity of the abrasive grains.

Figure 3:
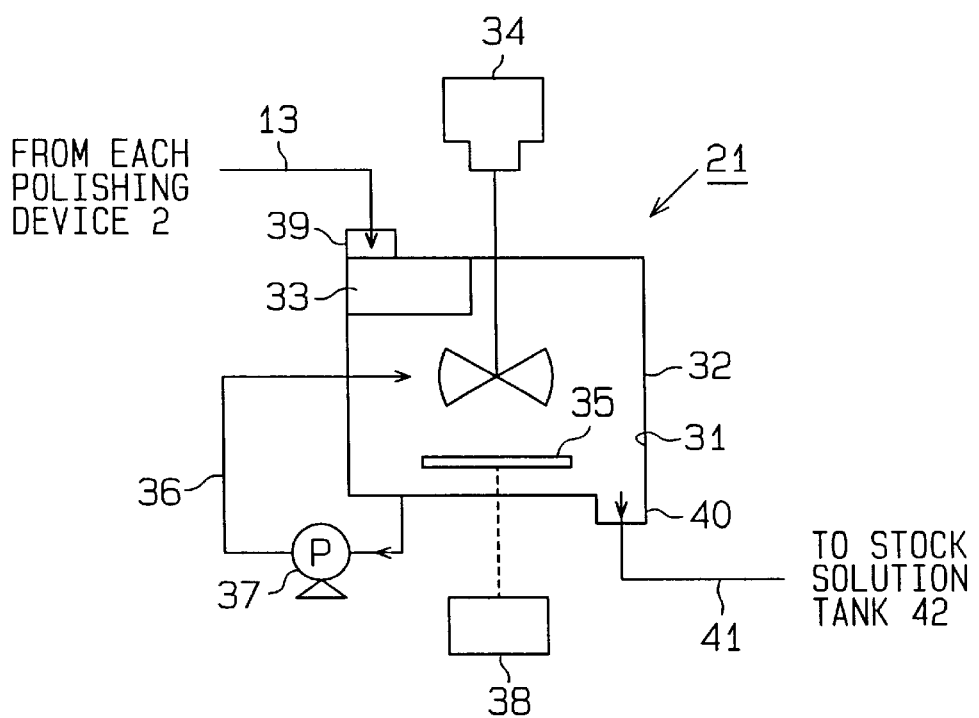
FIG. 3 is a schematic diagram of a crusher of the plant of FIG. 1.

The slurry effluent containing agglomerations of abrasive grains is introduced into the crushing chamber 31 through the pouring port 39, shown in FIG. 3, and the agglomerations in the effluent are crushed by the mill 33. After the crushing operation, any remaining agglomerations of abrasive grains are subject to a crushing and dispersion effected by the ultrasonic vibration of the ultrasonic vibrator plate 35. In addition, the slurry effluent which is pressurized by the pump 37 is passed through the circulating pipe 36 and ejected into the crushing chamber 31, whereby the remaining agglomerations of abrasive grains contained in the slurry effluent impinge upon the internal wall of the crushing chamber 31 and are crushed.

The abrasive grains which are crushed in such manner are dispersed evenly throughout the slurry effluent in a floating condition as a result of the agitating effect by the agitator 34, and are then passed through the discharge port 40 and the channel 41 and transferred into the stock solution tank 42 shown in FIG. 2.

The desitometer 44 and the pH meter 45 measure the specific gravity and the pH value of the slurry effluent in the stock solution tank 42, and the specific gravity controller 46 and the pH controller 47 regulate the quality of the slurry effluent in accordance with such measurements. After the regulation of the fluid quality, the slurry effluent is pumped by the pump 51 through the heat exchanger 52 to the respective concentrating membrane units 49, 50.

The slurry effluent is separated into a permeate fluid and a concentrate fluid by the concentrating membrane in each unit 49, 50. The concentrate fluid is passed through the channels 55, 56 and fed to the microfilters 57 where it is filtered coarsely. The filtered concentrate fluid passes through the flow rate controller 63 and the discharge channel 58 to the concentrate fluid tank 26. On the other hand, the permeate fluid passes through the channels 66, 67 and is stored temporarily in the back wash chambers 64, 65, and is subsequently transferred from the back wash chambers 64, 65 to the permeate fluid tank 27 while the flow rate of the permeate fluid is being measured by the flowmeter 71.

When using the permeate fluid which is temporarily stored in the back wash chamber 64 to cleanse the concentrating membrane in the unit 49, the valves 53, 79 are closed while the valve 81 is opened together with the control valve 74, thus allowing the inert gas from the gas purger 76 to be blown into the back wash chamber 64. The time interval during which the inert gas is blown into the chamber 64 is chosen so that the permeate fluid within the back wash chamber 64 is completely removed. The cleansing action of the concentrating membrane in the unit 50 similarly is performed by blowing the inert gas from the gas purger 77 into the back wash chamber 65. When the cleansing or back wash of the concentrating membrane of one of the units 49, 50 is being effected, the concentrating membrane of the other unit (50, 49) is used to continue the concentrating operation. In this manner, the concentrating operation is continuously performed using the pair of concentrating membrane units 49, 50 in an alternate fashion. It is also to be noted that there are provided two microfilters 57. This allows for continuous operation of the plant 1 such that when one of the microfilters is being changed, the remaining microfilter may be used to continue the concentrating operation.

The concentration of the concentrate fluid stored in the concentrate fluid tank 26 is adjusted by changing the temperature of the slurry effluent by means of the heat exchanger 52, which controls the speed at which the slurry effluent passes through the concentrate membrane in the units 49, 50. When the temperature of the heat exchanger 52 is raised, which increases the speed of the slurry effluent, the concentration of the concentrate fluid is increased. On the other hand, the concentration of the concentrate fluid is decreased when the temperature of the heat exchanger is controlled to reduce the flow speed of the slurry effluent. The flow speed is controlled by the flow rate controller 63 on the basis of the flow rate of the permeate fluid as measured by the flowmeter 71.

The permeate fluid stored in the permeate fluid tank 27 is fed to the slurry feeder 5, where it is used to dilute the stock solution used to prepare a fresh slurry fluid.

The abrasive effluent regeneration plant 1 of the present embodiment has the following advantages:

1. Agglomeration of abrasive grains contained in the slurry effluent which has been used to polish a semiconductor wafer are crushed during the crushing step and separated into a concentrate fluid and a permeate fluid, with the concentrate fluid being reused as a regenerated slurry fluid in polishing the semiconductor wafer. Accordingly, the amount of polishing stock solution used and the amount of sludge produced are significantly reduced. This reduces the manufacturing cost of a semiconductor device.

2. The crushing step allows a regenerated slurry fluid to be obtained which has abrasive grains of grain diameters comparable to the single abrasive grains in the fresh slurry fluid.

3. The use of the mill 33 enhances the effect of crushing the agglomerations of abrasive grains. A pressurizing circulation process enabled by the pressurizing tank 37 and/or ultrasonic oscillation process enabled by the ultrasonic oscillator 38 may be used in combination with the mill 33, thus allowing the agglomeration of abrasive grains to be crushed in a reliable manner.

4. Since the concentration or the specific gravity of the slurry effluent is adjusted, a concentrate fluid having a desired concentration is obtained. The pH value of the slurry effluent is also adjusted, and accordingly any remaining agglomerations of abrasive grains which were not been crushed during the crushing step are easily disintegrated in the process of being fed to the concentrating membrane units 49, 50, thus improving the dispersibility of the abrasive grains in the slurry effluent.

5. An agitation of the slurry effluent by the agitator 34 allows the crushed abrasive grains to be evenly dispersed throughout the fluid.

6. A coarse filtering of the concentrate fluid by the microfilter 57 prevents damage of a semiconductor wafer from occurring as it is polished using the regenerated slurry fluid.

7. The use of the permeate fluid in diluting the stock solution allows a fresh slurry fluid to be obtained with an improved dispersibility of abrasive grains. Temporary storage of the permeate fluid in the chambers 64, 65 allows a back wash process of the concentrating membrane using the permeating fluid at the time when contamination of the concentrating membrane is aggravated, thus allowing the concentrating membrane to be cleansed in a simple manner using the permeate fluid.

8. The flow rate of the permeate fluid is detected by the flowmeter 71, and the temperature of the heat exchanger 52 is controlled by the flow rate controller 63 on the basis of the detected flow rate, whereby the speed of flow of the slurry effluent before it is subject to the concentrating operation can be controlled, allowing a concentrate fluid having a desired concentration to be obtained.

9. The provision of the pair of concentrating membrane units 49, 50 and the pair of back wash chambers 64, 65 allows one of the concentrating membrane units to be used even during the time the other unit 49 or 50 is being cleansed, such that a continuous operation is enabled without requiring an interruption of the slurry fluid regeneration operation.

10. The provision of the pair of microfilters 57 allows a continuous operation by allowing one of the microfilters to be used while the other microfilter is being changed.

11. Since the concentration unit 23 is controlled such that a concentrate fluid having the same concentration as the slurry fluid which is used in the polishing device 2 can be obtained, the concentrate fluid can be directly used as the regenerated slurry fluid for the polishing device 2.

12. A fully automatic regeneration and the circulation system can be constructed since the concentrate fluid is fed to the polishing device 2 through the circulation channel 14.

It should be apparent to those skilled in the art that the present invention may be embodied in many other specific forms without departing from the spirit or scope of the invention. Particularly it should be understood that the invention may be embodied in the following forms:

a) The crusher may include any combination of the mill 33, the ultrasonic oscillation system 35, 38 and the pressurizing circulation system 36, 37. For example, the crusher may comprise the ultrasonic oscillation system and the pressurizing circulation system.

b) A dispersant may be used in the crushing step to promote crushing action upon the agglomerations of abrasive grains.

c) The concentrating operation is not limited to the separation into a concentrate fluid and a permeate fluid. By way of example, a concentrate fluid may be produced by causing an evaporation of moisture in the slurry effluent. When the separation process is used, it may be implemented by a centrifuging process, for example, rather than using a concentrating membrane. In addition, the concentrate fluid may be obtained by removing a supernatant liquid after the separation by flocculation such as by precipitation.

d) A concentrate fluid having a higher concentration than that used in the polishing device 2 may be produced. In this instance, the permeate fluid may be used in the slurry feeder 5 to dilute the concentrate fluid, thereby preparing a regenerated slurry fluid.

e) A step of discarding the slurry effluent as a sludge by controlling abrasive grain diameters, when the number of reuses has increased to result in abrasive grain diameters which are below a given value, may be used. In this instance, a high polishing capability of the slurry fluid is maintained.

f) The back wash process may be performed after a given number of concentrating operations. In such instance, the number of concentrating operations is counted, and the back wash process is carried out when the count reaches a given value. Alternatively, an operator may control the degree of contamination of the concentrating membrane using a suitable instrument, and may determine a timing when the membrane is to be cleansed on the basis of a value obtained by the instrument, thus manually effecting the back wash process.

g) One, two, three or more concentrating membrane units may be used.

h) One, two, three or more microfilters may be used.

i) The abrasive grains in the slurry fluid or polishing fluid are not limited to alumina, but may comprise colloidal silicon or diamond.

j) The present invention may be implemented as a system for feeding the concentrate fluid to the polishing device after the concentrate fluid in the concentrate fluid tank is transferred to a feeding tank.

k) The present invention is not limited in its application to the regeneration of an effluent which has been used in the polishing step for a semiconductor wafer, but may also be used in the regeneration of an effluent which has been used in the polishing of a package.

Therefore, the present examples and embodiment are to be considered as illustrative and not restrictive and the invention is not to be limited to the details given herein, but may be modified within the scope and the equivalence of the appended claims.

What is claimed is:

1. A method of reuse of a slurry effluent containing agglomerations of abrasive grains which has been used in polishing step in the manufacture of semiconductor, comprising the steps of:

crushing the agglomerations of abrasive grains contained in the slurry effluent in a crushing chamber, wherein the crushing step is performed using a pressurizing circulation process, where the pressurizing circulation process crushes the agglomerations of abrasive grains by causing an impingement of a pressurized slurry effluent against an inner wall of the crushing chamber while circulating the slurry effluent;

after crushing the agglomerations of abrasive grains, adjusting concentration and pH of the slurry effluent by adding fresh slurry fluid or regenerated slurry fluid thereto;

after adjusting the concentration and pH of the slurry effluent, concentrating the slurry effluent by separating the slurry effluent into a concentrate fluid and a permeate fluid using a concentrating membrane;

regenerating an abrasive fluid using the concentrate fluid containing the crushed abrasive grains; and cleansing the concentrating membrane using the permeate fluid.

2. The method according to claim 1, wherein the crushing step includes agitating the slurry effluent to cause the crushed abrasive grains to be dispersed in the slurry effluent.

3. The method according to claim 1, wherein the concentrating step includes controlling the concentration of the concentrate fluid by adjusting the temperature of the slurry effluent.

4. The method according to claim 3, wherein the concentration of the concentrate fluid is controlled to he substantially the same as the concentration of a fresh slurry fluid.

5. The method according to claim 3, wherein the concentrating step is performed using a plurality of concentrating membranes disposed in a plurality of concentrating paths.

6. The method according to claim 5, further comprising the step of cleansing a plurality of concentrating membranes in a time offset manner using the permeate fluid.

7. The method according to claim 1, wherein the cleansing step includes purging a gas into a storage chamber which temporarily stores the permeate fluid to cause the permeate fluid to be ejected toward the concentrating membrane, and wherein the gas is an inert gas which prevents oxidation of the permeate fluid.

8. The method according to claim 1, further comprising the step of filtering the concentrate fluid.

9. The method according to claim 8, wherein the filtering step is performed using a plurality of filters disposed in a plurality of filtering paths.

10. The method according to claim 1, further comprising the step of preparing a fresh slurry fluid using the permeate fluid.

* * * * *